US008822904B2

(12) United States Patent
Hayashi et al.

(10) Patent No.: US 8,822,904 B2
(45) Date of Patent: Sep. 2, 2014

(54) PLANT SENSOR HAVING A CONTROLLER CONTROLLING LIGHT EMISSION OF FIRST AND SECOND LIGHT EMITTERS AT TIMINGS DIFFERENT FROM EACH OTHER

(75) Inventors: Kunihiro Hayashi, Tokyo (JP); Peng Zhao, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 294 days.

(21) Appl. No.: 13/481,669

(22) Filed: May 25, 2012

(65) Prior Publication Data

US 2012/0298847 A1    Nov. 29, 2012

(30) Foreign Application Priority Data

May 26, 2011    (JP) ................... 2011-117540

(51) Int. Cl.
  *H01J 40/14*    (2006.01)
  *A01C 21/00*    (2006.01)
  *A01M 7/00*    (2006.01)
  *G01J 3/427*    (2006.01)

(52) U.S. Cl.
  CPC .............. *G01J 3/427* (2013.01); *A01C 21/007* (2013.01); *A01C 21/002* (2013.01); *A01M 7/0089* (2013.01)
  USPC .......................................... 250/221; 250/205

(58) Field of Classification Search
  USPC .......... 250/221, 205, 559.4, 216, 214 R, 239, 250/238, 339.1, 339.11–339.15; 356/402, 356/416–419
  See application file for complete search history.

(56) References Cited

U.S. PATENT DOCUMENTS

| 5,389,781 A | 2/1995 | Beck et al. |
| 5,793,035 A | 8/1998 | Beck et al. |
| 6,020,587 A * | 2/2000 | Spiering et al. .......... 250/339.11 |
| 6,304,321 B1 | 10/2001 | Wangler et al. |
| 7,910,876 B2 | 3/2011 | Kumagai et al. |

(Continued)

FOREIGN PATENT DOCUMENTS

| CN | 1945319 A | 4/2007 |
| CN | 101784885 A | 7/2010 |

(Continued)

OTHER PUBLICATIONS

The extended European Search Report dated Sep. 27, 2012; EP Application No. 12075050.0-2313.

(Continued)

*Primary Examiner* — Que T Le
(74) *Attorney, Agent, or Firm* — Studebaker & Brackett PC

(57) ABSTRACT

A plant sensor includes a first light emitter to emit first measuring light with a first wavelength to irradiate a growing condition measurement target therewith; a second light emitter to emit second measuring light with a second wavelength to irradiate the growing condition measurement target therewith; a light receiver to receive reflected light of each of the first and second measuring light from the growing condition measurement target and output a received light signal; a controller to control light emission; a light path merging unit to merge a first outgoing light path of the first measuring light from the first light emitter and a second outgoing light path of the second measuring light from the second light emitter; and a common outgoing light path connecting the light path merging unit to a light exit portion emitting the first measuring light and the second measuring light.

9 Claims, 9 Drawing Sheets

(56) References Cited

U.S. PATENT DOCUMENTS

| | | |
|---|---|---|
| 2005/0098713 A1 | 5/2005 | Holland |
| 2010/0324830 A1 | 12/2010 | Solie et al. |
| 2011/0186752 A1 | 8/2011 | Moise et al. |
| 2013/0120753 A1 | 5/2013 | Haas |

FOREIGN PATENT DOCUMENTS

| | | |
|---|---|---|
| EP | 2 158 801 A1 | 3/2010 |
| GB | 416962 A | 9/1934 |
| JP | 2010-54436 A | 3/2011 |
| WO | 98/57539 A1 | 12/1998 |
| WO | 2011/015598 A1 | 2/2011 |

OTHER PUBLICATIONS

The first Office Action issued by the Chinese Patent Office on Feb. 17, 2014, which corresponds to Chinese patent Application No. 201210167529.3 and is related to U.S. Appl. No. 13/481,669.

* cited by examiner

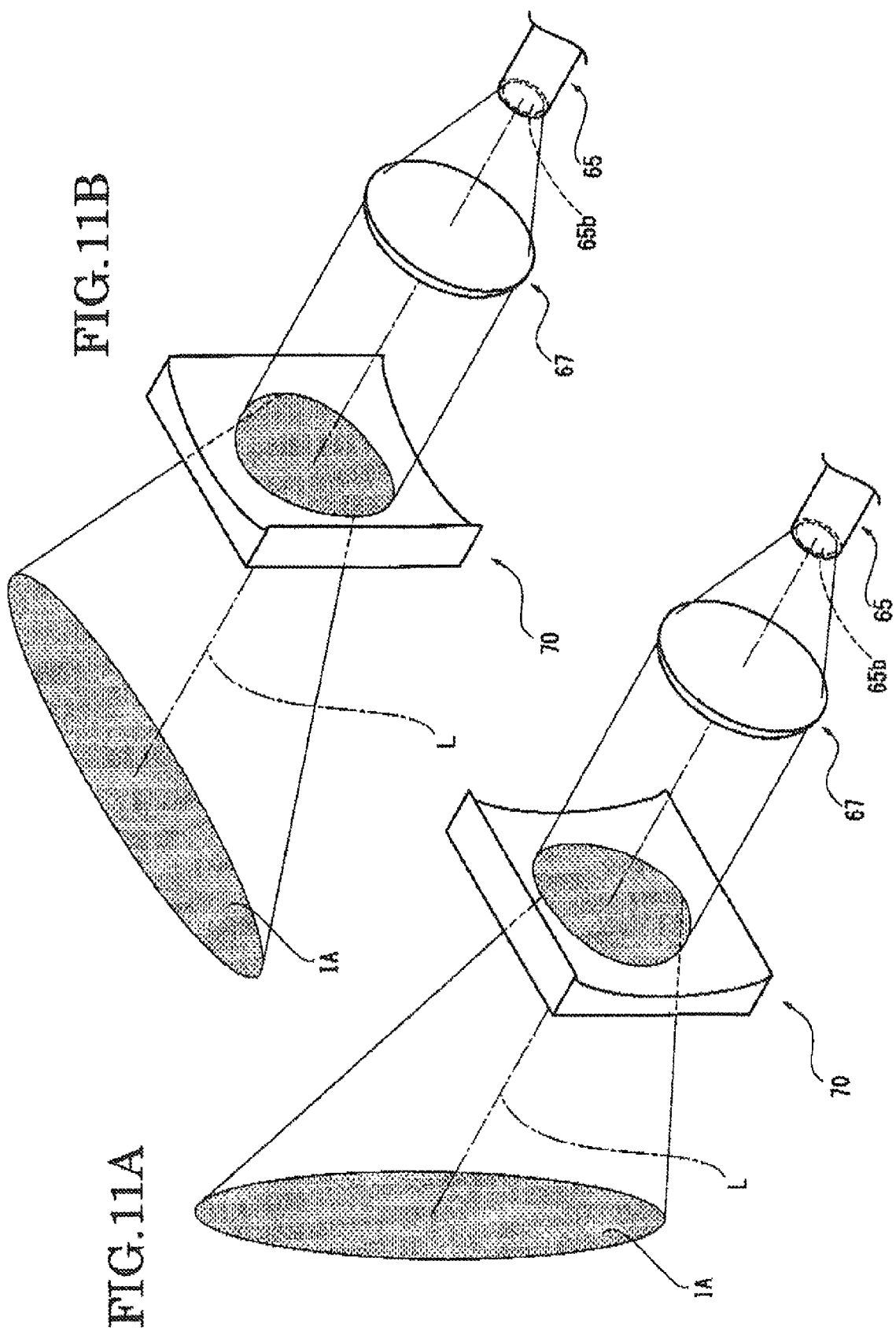

PLANT SENSOR HAVING A CONTROLLER CONTROLLING LIGHT EMISSION OF FIRST AND SECOND LIGHT EMITTERS AT TIMINGS DIFFERENT FROM EACH OTHER

CROSS REFERENCE TO RELATED APPLICATIONS

The present application is based on and claims priority from Japanese Patent Application Number 2011-117540, filed on May 26, 2011, the disclosure of which is hereby incorporated by reference herein in its entirety.

BACKGROUND OF THE INVENTION

1. Field of the Invention

The present invention relates to a plant sensor capable of determining the growing condition of plants or the like as a growing condition measurement target, by obtaining the reflection rates of measuring light by the plants or the like irradiated with the measuring light.

2. Description of the Related Art

For the purpose of improving the production capacities of agricultural products, it has been considered important recently to accurately know the growing condition of a crop and to produce the crop efficiently. To this end, it is a common practice to irradiate a measurement target whose growing condition is to be measured, e.g., a crop, with two measuring light fluxes having wavelengths different from each other; acquire the light fluxes reflected from the crop; obtain the reflection rates at which the crop reflects the two measuring light fluxes, respectively; and obtain the normalized difference vegetation index (NDVI) that is indicative of the growing condition of the crop, on the basis of the two reflection rates. In order to determine the growing condition of the crop more properly by obtaining the normalized difference vegetation index (NDVI) more accurately; a plant sensor has been proposed which is capable of more properly acquiring reflected light fluxes from the crop (for example, see Japanese Patent Application Publication No. 2010-54436).

This conventional plant sensor is configured to: irradiate a first irradiation area of a measurement target with a first measuring light flux and irradiate a second irradiation area of the measurement target with a second measuring light flux acquire the reflected light fluxes of the first measuring light flux and the second measuring light flux from the measurement target; and determine the growing condition of the measurement target by using these reflection rates of the reflected light fluxes. This plant sensor can more properly acquire the reflected light fluxes of the two measuring light fluxes from the crop by reducing the influence of light components attributed to ambient light, and thereby can calculate the normalized difference vegetation index (NDVI) more accurately. Thus, this plant sensor is capable of more appropriately determining the growing condition of the crop.

When irradiating a growing condition measurement target with the first measuring light and the second measuring light having the different wavelengths, the conventional plant sensor, however, has difficulty in locating the first irradiation area with the first measuring light and the second irradiation area with the second measuring light in exactly the same place, because the plant sensor includes a first light emitter and a second light emitter arranged in a line. More specifically, even though the first irradiation area and the second irradiation area are adjusted to exactly the same place on a plane at a certain distance from the plant sensor, the first irradiation area and the second irradiation area are displaced from each other on a plane at a distance other than the certain distance, because the first light emitter and the second light emitter emit light from positions different from each other. This displacement does not particularly cause a problem when the growing condition measurement target has evenness. However, when the growing condition measurement target has unevenness such as spots or the like, the displacement may act as an unstable factor for receiving the reflected light, and thereby hinder the reflected light from being acquired properly. In this regard, the conventional plant sensor still has room for improvement with the view to more accurately determining the growing condition of a crop.

SUMMARY OF THE INVENTION

An objective of the present invention is to provide a plant sensor capable of acquiring reflected light fluxes of two measuring light fluxes having different wavelengths from a growing condition measurement target.

To achieve the aforementioned objective, a plant sensor according to an embodiment of the present invention includes: a first light emitter configured to emit first measuring light with a first wavelength to irradiate a growing condition measurement target with the first measuring light; a second light emitter configured to emit second measuring light with a second wavelength to irradiate the growing condition measurement target with the second measuring light; a light receiver configured to receive reflected light of each of the first and second measuring light from the growing condition measurement target and output a received light signal; a controller configured to control light emission such that the first light emitter emits the first measuring light and the second light emitter emits the second measuring light at timings different from each other; a light path merging unit configured to merge a first outgoing light path of the first measuring light from the first light emitter and a second outgoing light path of the second measuring light from the second light emitter; and a common outgoing light path connecting the light path merging unit to a light exit portion from which each of the first measuring light and the second measuring light is to be emitted to the growing condition measurement target.

BRIEF DESCRIPTION OF THE DRAWINGS

FIG. 11A and FIG. 11B are explanatory diagrams schematically illustrating a state where an irradiation area is rotated about an outgoing optical axis L (rotated on its own axis) with a rotation of a cylindrical lens, FIG. 11A illustrates the formation of an irradiation area extending in a vertical direction when viewed from the front side, and FIG. 11B illustrates the formation of an irradiation area extending in a horizontal direction when viewed from the front side.

FIG. 12A illustrates a state where the two plant sensors are installed on both lateral sides of the tractor, and FIG. 12B illustrates a state where the two plant sensors are installed on right and left front sides of the tractor.

DETAILED DESCRIPTION OF THE PREFERRED EMBODIMENTS

Embodiments of a plant sensor according to the present invention will be described hereinafter in detail with reference to the drawings.

Figure 1:
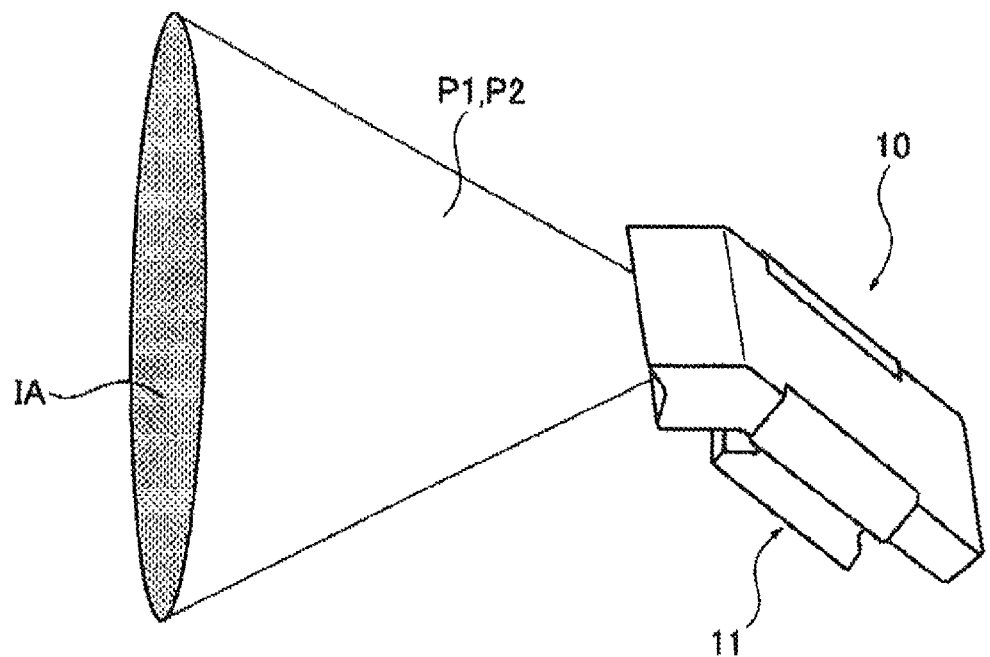
FIG. 1 is a schematic perspective view illustrating an embodiment of a plant sensor according to the present invention.
Figure 2:
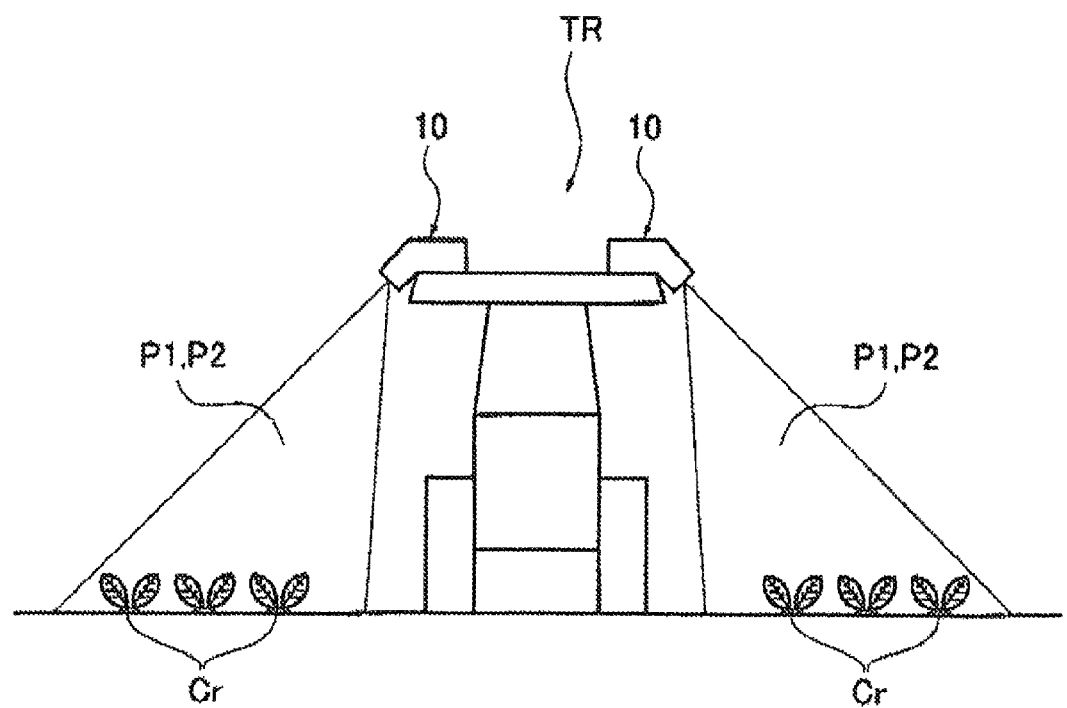
FIG. 2 is an explanatory diagram illustrating a state where two plant sensors are installed on a tractor TR.
Figure 3:
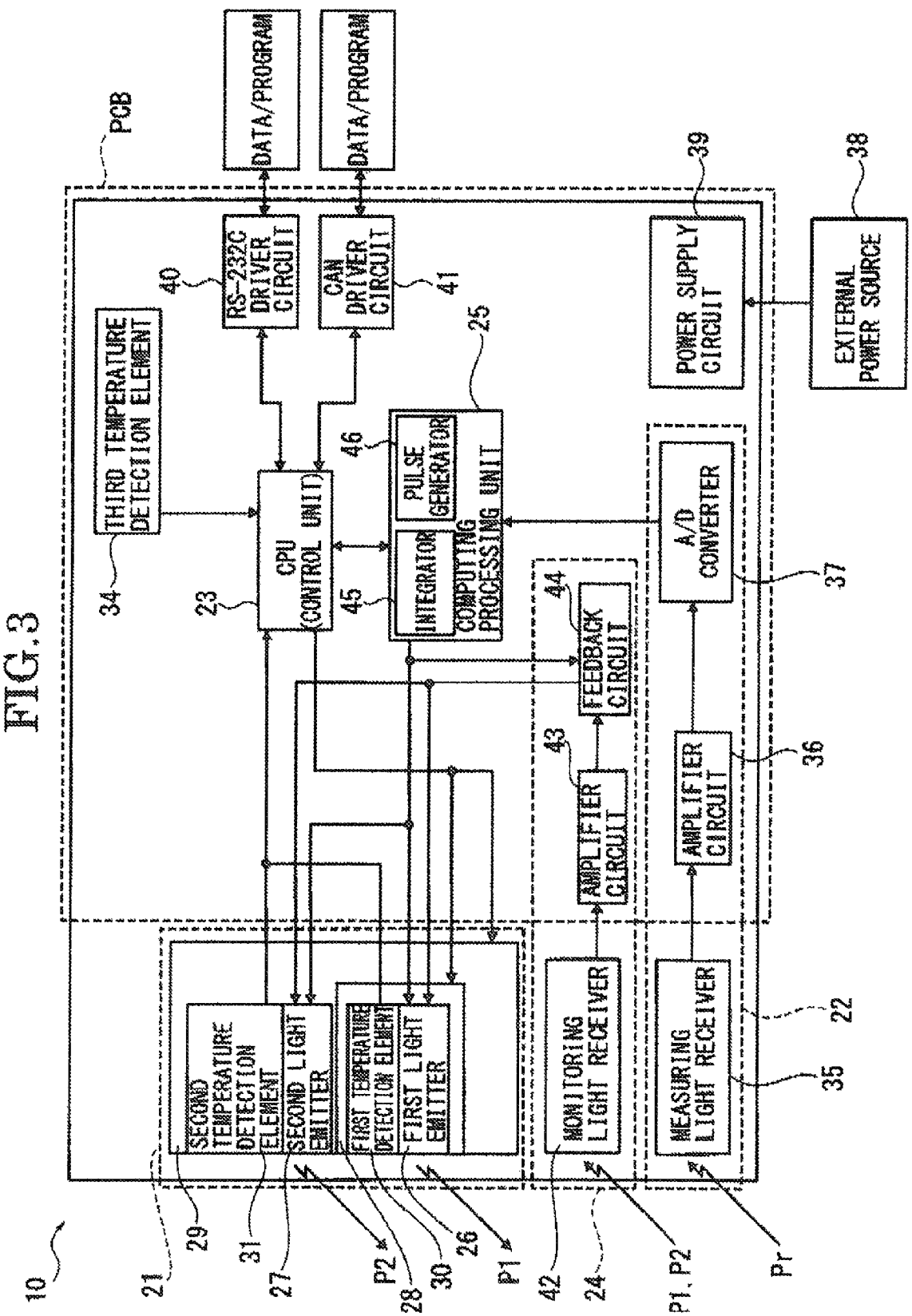
FIG. 3 is a block diagram schematically illustrating a structure of the plant sensor.

To begin with, description is provided for a structure of a plant sensor 10 according to the present invention. FIG. 1 illustrates a light emission state of a plant sensor according to an embodiment of the present invention. FIG. 2 illustrates two plant sensors 10 installed on a tractor TR. FIG. 3 illustrates the structure of the plant sensor 10.

The plant sensor 10 according to the present invention is made capable of emitting first measuring light P1 and second measuring light P2 in one and the same irradiation area IA as illustrated in FIG. 1. The first measuring light P1 and the second measuring light P2 are set to have wavelengths different from each other. Here, the wavelength of each of the first measuring light P1 and the second measuring light P2 is a wavelength at which the intensity of the measuring light takes a peak value in the spectrum of the measuring light. The plant sensor 10 irradiates plants (see reference signs Cr in FIG. 2) as a growing condition measurement target with the first measuring light P1 and the second measuring light 22, acquires reflected light Pr (see FIG. 8) of the first measuring light P1 and the second measuring light P2 from the growing condition measurement target, and generates the respective reflection rates of the first measuring light P1 and the second measuring light 22 by the growing condition measurement target. Here, the growing condition measurement target is a target whose growing condition is to be measured, and is any of crops such as vegetables and fruits. This generation of the reflection rates from the acquired reflected light Pr will be described in detail later.

The reflection rates of the first measuring light P1 and the second measuring light P2 can be used to determine the growing condition of the plants (see reference signs Cr in FIG. 2) as the growing condition measurement target. For example, light in a red wavelength band is used as the first measuring light P1 whereas light in an infrared wavelength band is used as the second measuring light P2. Then, the reflection rates of the first measuring light P1 and the second measuring light P2 by the plants as the growing condition measurement target are obtained. Here, assume that R denotes the reflection rate of the first measuring light P1 in the red wavelength band and IR denotes the reflection rate of the second measuring light P2 in the infrared wavelength band. By using the reflection rates R and IR, a normalized difference vegetation index (NDVI) indicating the growing condition (an amount of nutrient contained in the plants) of the plants as the growing condition measurement target can be obtained. The normalized difference vegetation index (NDVI) is expressed as (NDVI=(IR·R)/(IR+R)).

The plant sensor 10 is provided with an operation unit (not illustrated). This operation unit is operated to execute various functions in the plant sensor 10. The various functions include irradiations of the first measuring light P1 and the second measuring light P2, an adjustment of the rotational positions of the irradiation areas IA, an execution of calculation of the normalized difference vegetation index based on the first measuring light P1 and the second measuring light P2, and the like, which will be described later. In addition, the plant sensor 10 is provided with an attachment portion 11 (see FIG. 1) and is attachable to any desired location.

As illustrated in FIG. 2, the plant sensor 10 is installed on a tractor TR, which is one example of an agricultural machine, and is used in this state, for example. In the example in FIG. 2, two plant sensors 10 are installed on the right and left sides of the tractor TR, respectively, and are arranged to form irradiation areas IA (see FIGS. 1, 12 and others) at both lateral sides of the tractor TR. Since the tractor TR can form the irradiation areas IA using the two plant sensors 10 at both sides of a route where the tractor TR travels, the tractor TE can obtain the growing condition (normalized difference vegetation index) of a growing crop Cr by traveling by the side of the crop Cr. The tractor TR in this example is equipped with a fertilizer spreader Fs (see FIGS. 12A and 12B). The fertilizer spreader Fs is capable of adjusting an amount of fertilizer to be spread under the control of a controller whose illustration is omitted. The controller is capable of exchange data with each of the plant sensors 10 (a CPU 23 therein) via a later-described driver circuit 40 and driver circuit 41 (see FIG. 3) of the plant sensor 10. Thus, the fertilizer spreader Fs spreads the fertilizer in an amount according to the normalized difference vegetation index obtained by each of the plant sensors 10. Thus, only by traveling along a farm land where a crop. Cr is being cultured, the tractor TR can spread, onto the crop Cr, an appropriate amount of fertilizer according to the growing condition of the crop Cr, and thereby enables efficient cultivation of the crop Cr.

As illustrated in FIG. 3, the plant sensor 10 includes a light emission unit 21, a light receiving unit 22, a CPU (control unit) 23, an APC unit 24, and a computing processing unit 25. The light emission unit 21 includes a first light emitter 26, a second light emitter 27, a first temperature adjustment element 28, a second temperature adjustment element 29, a first temperature detection element 30 and a second temperature detection element 31.

The first light emitter 26 is a light emitting member to emit the first measuring light P1. In this embodiment, the first light emitter 28 includes a pulsed laser diode (PLD) whose outgoing light has a peak value in a wavelength of 735 nm, and is capable of emitting light in a red wavelength band (first wavelength). The second light emitter 27 is a light emitting member to emit the second measuring light P2. In this embodiment, the second light emitter 27 includes a pulsed laser diode (PLD) whose outgoing light has a peak value in a wavelength of 808 nm, and is capable of emitting light in an infrared wavelength band (second wavelength). The first light emitter 26 and the second light emitter 27 are driven (output power adjustment and on/off of lighting) under the control of a measuring light output controller (the APC unit 24 and the computing processing unit 25). The first temperature adjustment element 28, the second temperature adjustment element 29, the first temperature detection element 30 and the second temperature detection element 31 are provided to adjust the temperatures of the first light emitter 26 and the second light emitter 27.

The first temperature adjustment element 28 and the second temperature adjustment element 29 heat up or cool down the first light emitter 26 and the second light emitter 27. The first temperature adjustment element 28 and the second temperature adjustment element 29 are formed of peltier effect devices in this embodiment. The first temperature adjustment element 28 is formed in a size and shape fitted to the first light emitter 26, whereas the second temperature adjustment element 29 is formed in a rectangular shape with such a size that both of the second light emitter 27 and the first temperature adjustment element 28 can be mounted on the second temperature adjustment element 29 (see FIG. 4). The first temperature detection element 30 is configured to detect the temperature of the first light emitter 26 and is formed of a thermistor in this embodiment. The second temperature detection element 31 is configured to detect the temperature of the second light emitter 27 and is formed of a thermistor in this embodiment.

In the light emission unit 21 in this embodiment, the second temperature adjustment element 29 is attached to a base board 32 and a metal plate having almost the same size as the second temperature adjustment element 29 is placed on the second temperature adjustment element 29. The second light emitter 27 is provided on one corner portion of the metal plate 33, and the first light emitter 26 is provided on another corner portion of the metal plate 33, which is diagonally opposite to the one corner potion, with the first temperature adjustment element 28 interposed in between. In this way, the second light emitter 27 is attached to the base board 32 with the metal plate 33 and the second temperature adjustment element 29 interposed in between. In addition, the first light emitter 26 is attached to the base board 32 with the first temperature adjustment element 28, the metal plate 33, and the second temperature adjustment element 29 interposed in between. The first temperature detection element 30 is attached to the first light emitter 26 and the second temperature detection element 31 is attached to the second light emitter 27. Note that the light emission unit 21 in this embodiment further includes a thermistor as a third temperature detection element 34 configured to detect the temperature of a printed circuit board PCB on which various circuits are mounted, as illustrated in FIG. 3. If the third temperature detection element 34 is provided in the vicinity of a light receiver (the light receiving unit 22 (a measuring light receiver 35) or the APC unit 24 (a monitoring light receiver 42)), the third temperature detection element 34 can be used to detect the temperature of the printed circuit board PCB at a portion provided with a drive circuit for the light receiver, and the detected temperature can be used to control the received light signal in the light receiver.

The light emission unit 21 inputs detection outputs of the first temperature detection element 80, the second temperature detection element 31 and the third temperature detection element 84 to the CPU 23. The CPU 23 controls the first temperature adjustment element 28 based on the detection result from the first temperature detection element 30 so that the temperature of the first light emitter 26 can be constant, and controls the second temperature adjustment element 29 based on the detection result from the second temperature detection element 31 so that the temperature of the second light emitter 27 can be constant. To this end, the CPU 23 functions as a first temperature control circuit to control the temperature of the first light emitter 26 and also functions as a second temperature control circuit to control the temperature of the second light emitter 27. In this embodiment, the second temperature adjustment element 29 directly adjusts the temperature of the second light emitter 27 and also adjusts the temperature of the first light emitter 26 via the first temperature adjustment element 28.

Figure 4:
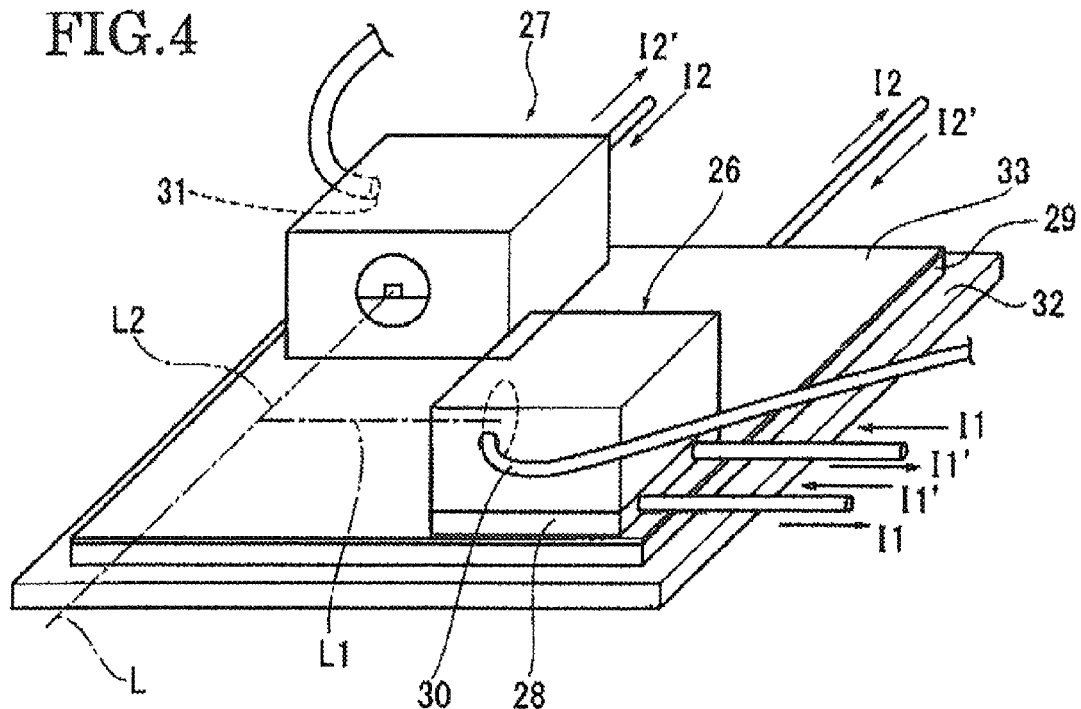
FIG. 4 is an explanatory view for explaining a structure for temperature adjustment by a first temperature adjustment element and a second temperature adjustment element.

In this embodiment, since the second temperature adjustment element 29 is formed of the peltier effect device, the second temperature adjustment element 29 is capable of making temperature adjustment in accordance with current direction control performed by the CPU 23. As illustrated in FIG. 4, when a current flows in an arrow I2 direction, the second temperature adjustment element 29 dissipates heat to heat the second light emitter 27 via the metal plate 33. On the other hand, when a current flows in an arrow I2' direction, the second temperature adjustment element 29 absorbs heat to cool the second light emitter 27 via the metal plate 33.

In addition, in this embodiment, since the first temperature adjustment element 28 is formed of the peltier effect device, the first temperature adjustment element 28 is capable of making temperature adjustment in accordance with current direction control performed by the CPU 23. When currents flow in an arrow I1 direction, the first temperature adjustment element 28 dissipates heat to heat the first light emitter 26. On the other hand, when currents flow in an arrow I1' direction, the first temperature adjustment element 28 absorbs heat to cool the first light emitter 26. Since the first temperature adjustment element 28 (the first light emitter 26) is provided on the second temperature adjustment element 29 with the metal plate 33 interposed in between, the first temperature adjustment element 28 (the first light emitter 26) is influenced by the heat dissipation or absorption of the second temperature adjustment element 29 in the heating or cooling operation. For this reason, the temperature of the first temperature adjustment element 28 (first light emitter 26) is adjusted by the CPU 23 in consideration of the temperature adjustment made by the second temperature adjustment element 29.

The light receiving unit 22 includes the measuring light receiver 35, an amplifier circuit 36 and an A/D converter 37, as illustrated in FIG. 3. The measuring light receiver 35 is provided to acquire the reflected light Pr from the growing condition measurement target (crop Cr) irradiated with each of the first measuring light P1 and the second measuring light P2. The measuring light receiver 35 outputs an electric signal according to a volume of the received light when the light is incident on its light receiving surface. In this embodiment, the measuring light receiver 35 includes six photodiodes (PDs) which are not illustrated. The measuring light receiver 35 outputs the electric signal (detection output) to the amplifier circuit 36. Note that the electric signal outputted from the measuring light receiver 35 contains a component according to a light volume of the reflected light Pr from the growing condition measurement target (crop Cr) and a component according to a light volume of ambient light. The amplifier circuit 36 amplifies the inputted electric signal as needed and outputs the amplified electric signal to the A/D converter 37. The A/D converter 37 converts the inputted electric signal into a digital signal, and outputs the digital signal to the computing processing unit 25.

The CPU (central processing unit) 23 functions as an overall control unit to control all the components supplied with power by an external power source 38 via a power supply circuit 89. The CPU 23 is capable of exchanging data with the outside via the driver circuit 40 in conformity with the standard of RS-232C and the driver circuit 41 capable of CAN communication, and thereby is able to acquire data or programs necessary for driving the plant sensor 10. Additionally, the CPU 23 is able to adjust the temperatures of the first light emitter 26 and the second light emitter 27 (control the driving of the first temperature adjustment element 28 and the second temperature adjustment element 29), as described above.

Moreover, as will be described later, the CPU 23 functions as a computing unit to calculate the reflection rates of the first measuring light P1 and the second measuring light P2 by the growing condition measurement target (crop Cr) irradiated with the first measuring light P1 and the second measuring light P2, on the basis of integration signals outputted from the computing processing unit 25 (an integrator 45 therein), and to calculate the normalized difference vegetation index of the growing condition measurement target (crop Cr) on the basis of the calculation results (the calculated reflection rates). Thus, the CPU 23, that is, the plant sensor 10 is able to obtain the information on the growing condition of the growing condition measurement target by using the first measuring light P1 and the second measuring light P2.

Figure 5:
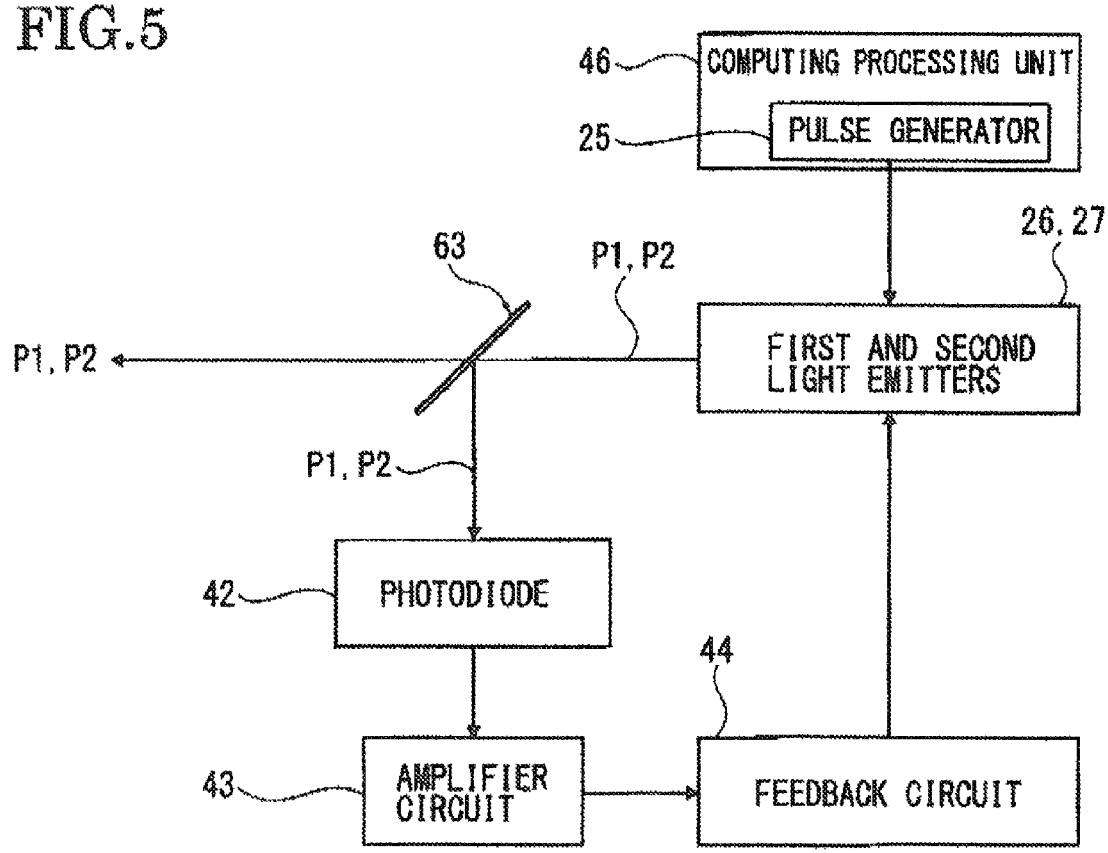
FIG. 5 is an explanatory diagram illustrating a concept of an APC unit configured to make constant a light emission volume of the first light emitter.

The APC unit 24 stabilizes the output powers of the first light emitter 26 and the second light emitter 27 at a certain level (feedback control). The output powers herein indicate the intensities (volumes of emitted light) of the emitted first measuring light P1 and the emitted second measuring light P2. The APC unit 24 includes the monitoring light receiver 42, an amplifier circuit 43 and a feedback circuit 44. As will be described later, the monitoring light receiver 42 is provided to acquire a part of the first measuring light P1 and a part of the second measuring light P2 before emission from the plant sensor 10 (a cylindrical lens 70 as an light exit portion) (see FIGS. 5 and 10). The monitoring light receiver 42 outputs an electric signal according to a volume of received light when the light is incident on its light receiving surface. In this embodiment, the monitoring light receiver 42 includes a PD (photodiode). The monitoring light receiver 42 outputs the electric signal (detection output) to the amplifier circuit 43, as illustrated in FIGS. 3 and 5. The amplifier circuit 43 amplifies the inputted electric signal as needed, and outputs the amplified electric signal to the feedback circuit 44. The feedback circuit 44 controls drive currents for the first light emitter 26 and the second light emitter 27 such that the received light signals can be at a constant level. In this way, the first measuring light P1 and the second measuring light P2 emitted from the first light emitter 26 and the second light emitter 27 are automatically controlled to have constant intensities. The detailed configuration of this control will be described later.

To this end, in the APC unit 24, the monitoring light receiver 42 functions as an auxiliary light receiving element to receive a part of the first measuring light P1 and a part of the second measuring light P2 emitted toward the growing condition measurement target (crop Cr) by the first light emitter 26 and the second light emitter 27. Moreover, in the APC unit 24, the amplifier circuit 43 and the feedback circuit 44 function as a light volume controller to control the output powers of the first light emitter 26 and the second light emitter 27 such that the intensities of the first measuring light P1 and the second measuring light P2 can be constant on the basis of the received light signals from the auxiliary light receiving element.

The computing processing unit 25 is formed of a field programmable gate array (FPGA), for example, and includes the integrator 45 to output the integration signal obtained by integrating the received light signals from the measuring light receiver 35 for a predetermined time period, and a light emission controller (a pulse generator) 46 to generate pulse signals for controlling light emission of the first light emitter 26 and the second light emitter 27, as illustrated in FIG. 3.

The operations of the integrator 45 will be described in detail later.

The pulse generator 46 generates pulse signals for controlling light emission of the first light emitter 26 and the second light emitter 27 such that the first light emitter 26 and the second light emitter 27 emit light at different timings, and outputs the pulse signals to the first light emitter 26 and the second light emitter 27. For this operation, in collaboration with the APC unit 24, the computing processing unit 25 (the pulse generator 46) functions as a measuring light output controller to control the driving (output power adjustment and on/off of lighting) of the first light emitter 26 and the second light emitter 27. In this embodiment, the measuring light output controller (the computing processing unit 25) causes the first light emitter 26 and the second light emitter 27 to alternately emit light for equal time durations, and to both stop driving (be lighted off) for another equal time duration after every light emission of either of the first light emitter 26 and the second light emitter 27.

Figure 6:
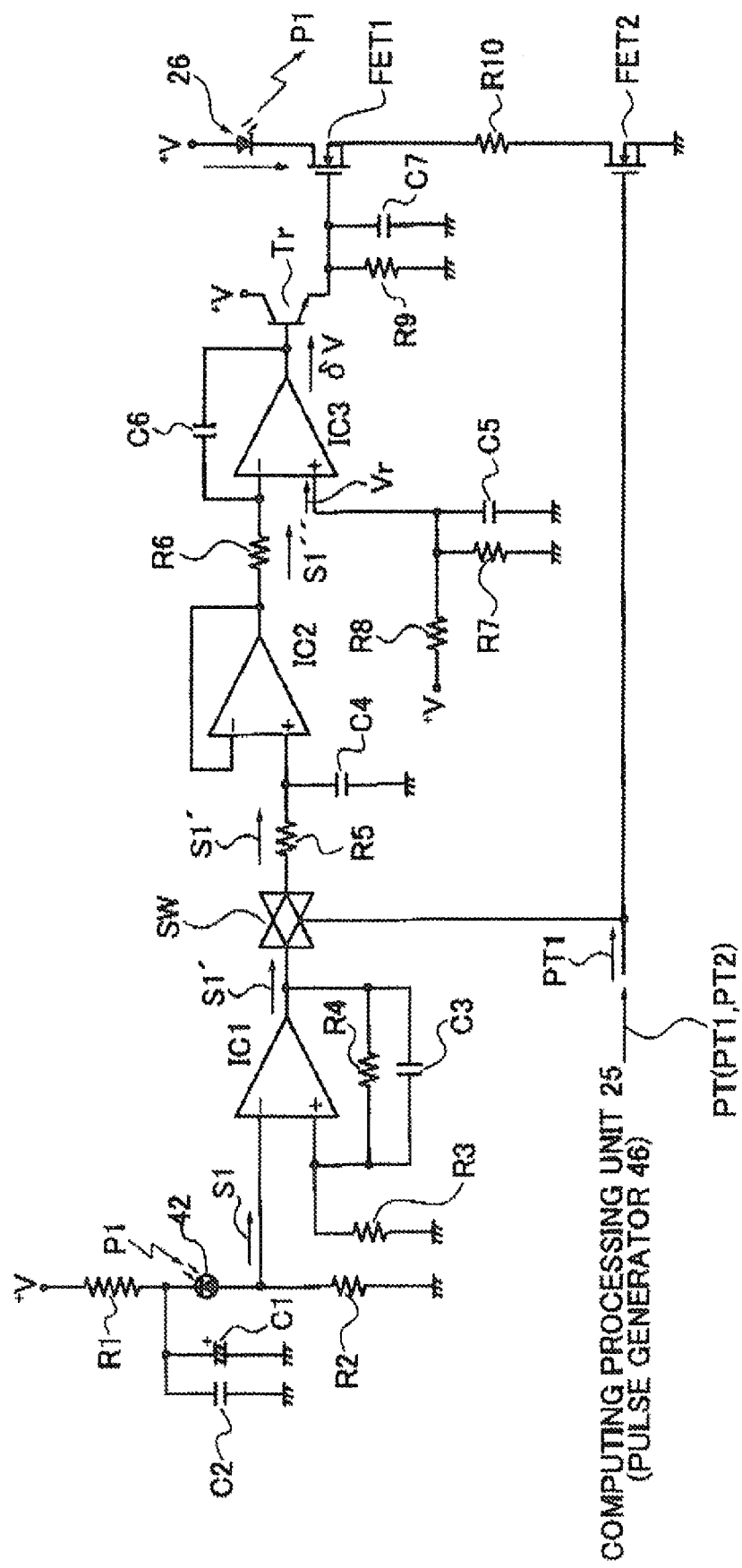
FIG. 6 is a circuit diagram illustrating structures of a first light volume controller (APC unit) to control the first light emitter such that the light emission volume of the first light emitter can be constant, and a light emission controller (a pulse generator) to control light emission timings of the first light emitter.

Next, description is provided for a detailed structure of the light volume controller in the measuring light output controller to control the driving of the first light emitter 26 and the second light emitter 27. The light volume controller controls the output powers of the first light emitter 26 and the second light emitter 27 such that the intensities of the first measuring light P1 and the second measuring light P2 can be constant. Here, the light volume controller controls the output powers of the first light emitter 26 and the second light emitter 27 by using the common monitoring light receiver 42 and using light volume control circuits dedicated to the first light emitter 26 and the second light emitter 27, respectively. The two light volume control circuits are the same in structure and operation. Thus, with reference to FIG. 6, the following description is provided only for the light volume control circuit for the first light emitter 26 that operates using the monitoring light receiver 42, and the description for the light volume control circuit for the second light emitter 27 is omitted. FIG. 6 provides a circuit diagram illustrating structures of the first light volume controller (the APC unit 24) to control the first light emitter 26 such that the light volume emitted by the first light emitter 26 can be constant, and the light emission controller (the pulse generator 46) to control the light emission timings of the first light emitter 26.

The light volume control circuit for the first light emitter 26 illustrated in FIG. 6 includes the monitoring light receiver 42 capable of receiving a part of the first measuring light P1 and a part of the second measuring light P2. A voltage +V is applied to a cathode of the monitoring light receiver 42 via a resistor R1. The connection point of the cathode and the resistor R1 is grounded via a capacitor (electrolytic capacitor) C1. The capacitor C1 is connected to a capacitor C2 in parallel. An anode of the monitoring light receiver 42 is grounded via a resistor R2.

The connecting point of the anode of the monitoring light receiver 42 and the resistor R2 is connected to a minus input terminal − of an operational amplifier IC1 (hereinafter also referred to as an op-amp IC1). A plus input terminal + of the op-amp IC1 is grounded via a resistor R3. An output terminal of the op-amp IC1 is connected to the plus input terminal + of the op-amp IC1 via a feedback resistor R4. The feedback resistor R4 is connected to a capacitor C3 in parallel.

In collaboration with the resistors R1 to R4 and the capacitors C1 to C3, the op-amp IC1 has functions to perform current-voltage conversion of a pulsed received light signal S1 (the electric signal according to each of the received first measuring light P1 and the second measuring light P2) from the monitoring light receiver 42, and to output pulsed received light signal S1' obtained by amplifying the pulsed received light signal S1.

The output terminal of the op-amp IC1 is connected to a plus input terminal + of an operational amplifier IC2 (hereinafter also referred to as the op-amp IC2) via an analog switching element SW (hereinafter also referred to as the switch SW) and a resistor R5. The connecting point of the plus input terminal + of the op-amp IC2 and the resistor R5 is grounded via a capacitor C4. An output terminal of the op-amp IC2 is connected to a minus input terminal − of the op-amp IC2 and is also connected to a minus input terminal − of an operational amplifier IC3 (hereinafter also referred to as the op-amp IC3) via a resistor R6. When a pulse PT1 to be described later is inputted, the switch SW is turned on and makes the state between the output terminal of the op-amp IC1 and the plus input terminal + of the op-amp IC2 conductive via the resistor R5. In other words, when the switch SW is turned on, the amplified pulsed received light signal S1' is outputted to the plus input terminal + of the op-amp IC2.

In collaboration with the resistor R5, the capacitor C4 and the resistor R6, the op-amp IC2 has functions to smooth the pulsed received light signal S1' and to output the smoothed signal S1' as a continuous received light signal S1" to the minus input terminal − of the op-amp IC3 in the following stage.

A plus input terminal + of the op-amp IC3 is grounded via a capacitor C5. The capacitor C5 is connected to a resistor R7 in parallel. A voltage V is applied to the connecting point of the plus input terminal + of the op-amp IC3 and the capacitor C5 via a resistor R8. An output terminal of the op-amp IC3 is connected to the minus input terminal − of the op-amp IC3 via a capacitor C6 and is also connected to a base of a transistor Tr. A voltage V is applied to a collector of the transistor Tr. Moreover, an emitter of the transistor Tr is connected to a gate of a field-effect transistor FET 1 (hereinafter also referred to as the FET 1), and is also grounded via a resistor R9. The resistor R9 is connected to a capacitor C7 in parallel.

A drain of the FET 1 is connected to a cathode of the first light emitter 26 that is a laser diode PLD. A voltage V is applied to an anode of the first light emitter 26. A source of the FET 1 is connected to a drain of a field-effect transistor FET 2 (hereinafter also referred to as the FET 2) via a resistor R10. A source of the FET 2 is grounded.

The op-amp IC3 compares an output voltage (the continuous received light signal S1") outputted from the output terminal of the op-amp IC2 and a reference voltage Vr determined by the capacitor C5, the resistor R7 and the resistor R8, and outputs a difference voltage UV between the output voltage from the op-amp IC3 and the reference voltage Vr to the base of the transistor Tr. The transistor Tr controls a gate voltage for the FET 1 based on the inputted difference voltage δV such that the light emission volume of the first measuring light P1 emitted by the first light emitter 26 can be constant.

The op-amp IC3, the transistor Tr, the resistors R7 to R9, and the capacitors C5 to C7 mainly constitute the feedback circuit 44.

The pulse generator 46 of the computing processing unit 25 inputs cyclic pulses PT to the switch SW and the gate of the FET 2. The pulse generator 46 generates the cyclic pulses PT for causing the first light emitter 26 and the second light emitter 27 to alternately emit light for equal time durations with predetermined time intervals provided between the light emissions. The FET 2 is cyclically turned on and off when the gate of the FET 2 receives the cyclic pulses PT. The switch SW is cyclically turned on and off when the cyclic pulses PT are inputted to the switch SW, as described above. With these operations, a current cyclically flows through the first light emitter 26 in an arrow direction, and thereby the first light emitter 26 cyclically emits light (pulsed light emission) and outputs the pulsed first measuring light P1 in response to the cyclic pulses PT.

Figure 7A:
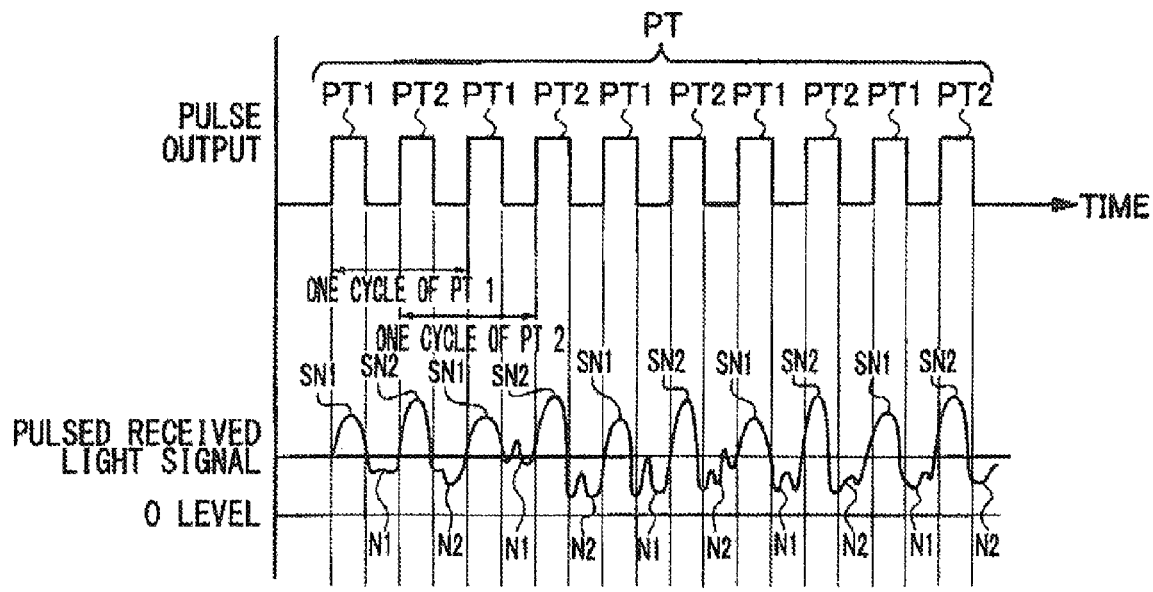
FIG. 7A is an explanatory diagram for explaining an example of integration processing of received light signals from a light receiving unit (a measuring light receiver), the diagram depicting a relationship between outputs of cyclic pluses PT illustrated in FIG. 6 and received light outputs from the light receiving unit.

The cyclic pulses PT outputted by the pulse generator 46 of the computing processing unit 25 include pulses PT1 for causing the first light emitter 26 to cyclically emit light and pulses PT2 for causing the second light emitter 27 to cyclically emit light, as illustrated in FIG. 7A. The cyclic pulses PT1 and the cyclic pulses PT2 are alternately generated with equal pulse time widths, and thereby cause the first light emitter 26 and the second light emitter 27 to alternately emit light for the same time durations. Moreover, a time interval between the generation of the cyclic pulse PT1 and the generation of the cyclic pulse PT2 and a time interval between the generation of the cyclic pulse PT2 and the generation of the cyclic pulse PT1 are set to be equal to each other. Thus, the first light emitter 26 and the second light emitter 27 both stop driving (are lighted off) for the equal time duration after every light emission of either of the first light emitter 26 and the second light emitter 27. To this end, the cyclic pulses PT1 and the cyclic pulses PT2 are set to have equal cycles.

The integrator 45 of the computing processing unit 25 has an integration function to integrate the received light signals from the light receiving unit 22 (the measuring light receiver 35) for a predetermined period of time, and to output the integrated received light signal, as described above. Here, assume that the cyclic pulses PT including the cyclic pulses PT1 and the cyclic pulses PT2 illustrated in FIG. 7A are generated, and that the first measuring light P1 and the second measuring light P2 are emitted in response to the generated cyclic pulses PT. In this case, the measuring light receiver 35 (see FIG. 3) of the light receiving unit 22 acquires (receives light) a light volume containing a reflected light component of the first measuring light P1 and an ambient light component due to ambient light, and acquires (receives light) a light volume containing a reflected light component of the second measuring light P2 and an ambient light component due to the ambient light. As a result, the light receiving unit 22 cyclically outputs a received light signal SN1 corresponding to the light volume containing the reflected light component of the first measuring light P1 and the ambient light component due to the ambient light, and a received light signal SN2 corresponding to the light volume containing the reflected light component of the second measuring light P2 and the ambient light component due to the ambient light, alternately.

Upon receipt of the received light signals from the light receiving unit 22, the integrator 45 of the computing processing unit 25 performs: a first integration step synchronous with light-on control of each of the first light emitter 26 and the second light emitter 27 by the pulse generator 46; and a second integration step synchronous with light-off control of each of the first light emitter 26 and the second light emitter 27 by the pulse generator 46. In the first integration step, the integrator 45 integrates a predetermined number of received light signals SN1 containing the reflected light component of the first measuring light P1, and integrates the predetermined number of received light signals SN2 containing the reflected light component of the second measuring light P2. Then, the integrator 45 outputs the integration result of each of the first and second measuring light to the CPU 23. In the second integration step, the integrator 45 integrates the predetermined number of received light signals N1 that are pulsed received light signals after termination of emission of the first measuring light P1, i.e., the pulsed received light signals from which the reflected light component of the first measuring light P1 is excluded, and integrates the predetermined number of received light signals N2 that are pulsed received light signals after termination of emission of the second measuring light P2, i.e., the pulsed received light signals from which the reflected light component of the second measuring light P2 is excluded. Then, the integrator 45 outputs the integration result of the predetermined number of the received light signals N1 and the integration result of the predetermined number of the received light signals N2 to the CPU 23.

Figure 7B:
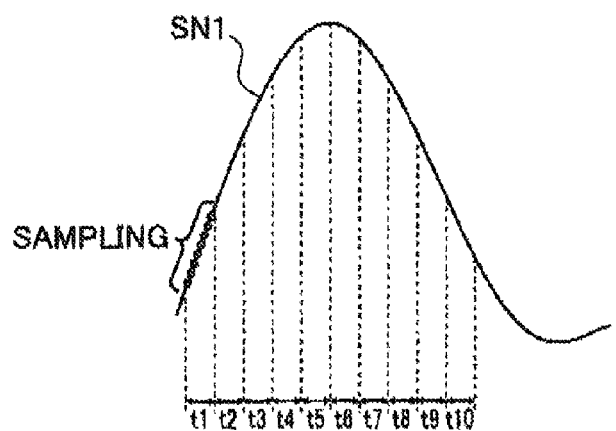
FIG. 7B is a graph indicating that a received light output is divided into several segments and is sampled in each segment.
Figure 7C:
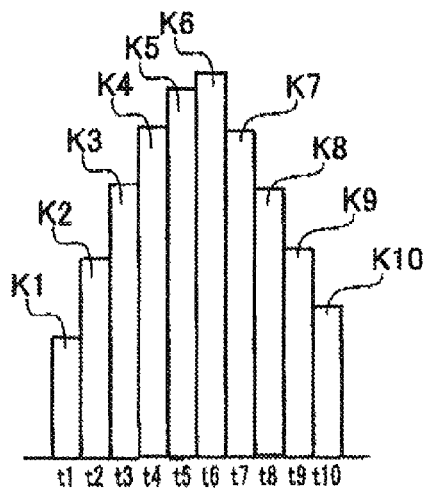
FIG. 7C is a graph indicating that sampling values in each segment are added up, and that the largest added value (K6 in FIG. 7C) among the added values of all the segments is obtained as a received light output value.

The following description provides an example of this integration processing by the integrator 45 of the computing processing unit 25. The integrator 46 divides a pulse width of the received light signal SN1 into segments t1 to t10 as illustrated in FIG. 7B, performs sampling of the received light output multiple times per segment (for each of segments t1 to t10), adds up (integrates) the sampling values, and temporarily stores the added value. In this step, for example, the integrator 45 performs sampling of the received light output eight times in the segment t1, adds up the eight sampling values to obtain the added value K1 illustrated in FIG. 7C, and temporarily stores the added value K1. The integrator 45 performs the processing of obtaining added values K2 to K10 for the respective segments in the same manner, extracts the largest added value among the added values K1 to K10, and obtains the extracted added value as a received light output value indicating the peak value (maximum value) of the received light signal SN1. In the example illustrated in FIG. 7C, the received light output value (the peak value of the received light signal SN1 (see FIG. 7B)) is the added value K6.

Figure 8:
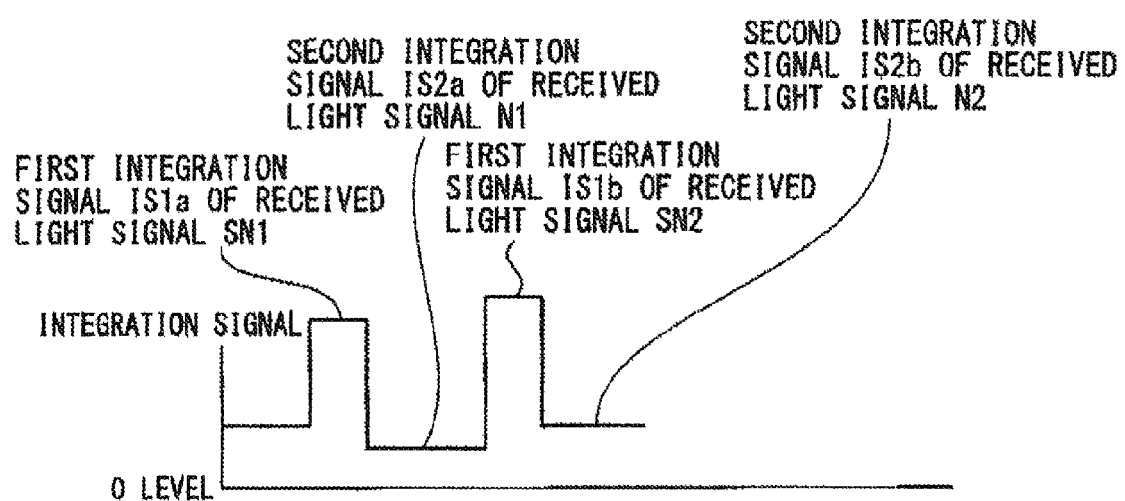
FIG. 8 is an explanatory diagram for explaining integration signals outputted from a computing processing unit (an integrator).

The integrator 45 (the computing processing unit 25) obtains the received light output value (peak value) for each of multiple received light signals SN1 illustrated in FIG. 7A, and integrates a predetermined number of received light output values (peak values) of the respective received light signals SN1, and thereby obtains a first integration signal IS1$a$ in which the reflected light component of the first measuring light P1 is emphasized (see FIG. 8). Moreover, by performing the same computation processing for multiple received light signals SN2, the integrator 45 obtains the received light output values (peak values) of the respective received light signals SN2 based on sampling, integrates the predetermined number of received light output values (peak values) of the respective received light signal SN2, and thereby obtains a first integration signal IS1$b$ in which the reflected light component of the second measuring light P2 is emphasized (see FIG. 8). The first integration step is a step of obtaining the first integration signal IS1$a$ and the first integration signal IS1$b$.

Further, by performing the same computation processing for multiple received light signals N1, the integrator 46 obtains the received light output values (peak values) of the respective received light signals N1 based on sampling, integrates the predetermined number of received light output values (peak values) of the respective received light signals N1, and thereby obtains a second integration signal IS2$a$ attributed to the ambient light alone with the reflected light component of the first measuring light P1 excluded therefrom (see FIG. 8). Then, by performing the same computation processing for multiple received light signals N2, the integrator 45 obtains the received light output values (peak values) of the respective received light signals N2 based on sampling, integrates the predetermined number of received light output values (peak values) of the respective received light signals N2, and thereby obtains a second integration signal IS2$b$ attributed to the ambient light alone with the reflected light component of the second measuring light P2 excluded therefrom (see FIG. 8). The second integration step is a step of obtaining the second integration signal IS2$a$ and the second integration signal IS2$b$.

Figure 9:
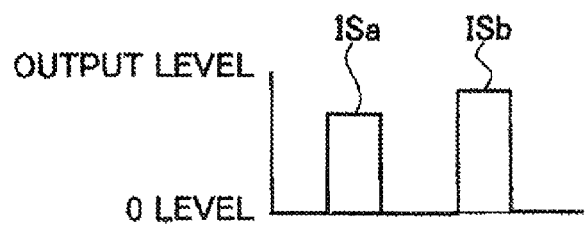
FIG. 9 is an explanatory diagram for explaining two integration signals from which noise is excluded.

The computing processing unit 25 (the integrator 45) inputs the first integration signal IS1$a$, the first integration signal ISM, the second integration signal IS2$a$, and the second integration signal IS2$b$ to the CPU 23, as described above. Then, the CPU 23 subtracts the second integration signal IS2$a$ from the first integration signal IS1$a$, and thereby calculates a first received light signal ISa indicating the reflected light component of the first measuring light P1 while excluding the light component due to the ambient light (see FIG. 9). Moreover, the CPU 23 subtracts the second integration signal IS2$b$ from the first integration signal IS1$b$, and thereby calculates a second received light signal ISb indicating the reflected light component of the second measuring light P2 while excluding the light component due to the ambient light (see FIG. 9). After that, for the growing condition measurement target (crop Cr) irradiated with the first measuring light P1 and the second measuring light P2, the CPU 23 calculates the reflection rate of the first measuring light P1 on the basis of the total light emission volume of the first light emitter 26 and the first received light signal ISa, calculates the reflection rate of the second measuring light P2 on the basis of the total light emission volume of the second light emitter 27 and the second received light signal ISb, and then calculates the normalized difference vegetation index. In this way, the CPU 23 is capable of obtaining the normalized difference vegetation index of the growing condition measurement target (crop Cr) irradiated with the first measuring light P1 and the second measuring light P2, on the basis of the reflection rate of the first measuring light P1 and the reflection rate of the second measuring light P2 having extremely-low influence of the light components due to the ambient light, and thereby is capable of obtaining more accurate information on the growing condition of the growing condition measurement target (crop Cr). The information on the growing condition of the growing condition measurement target (crop Cr) can be outputted to the outside via the driver circuit 40 or the driver circuit 41.

Figure 10:
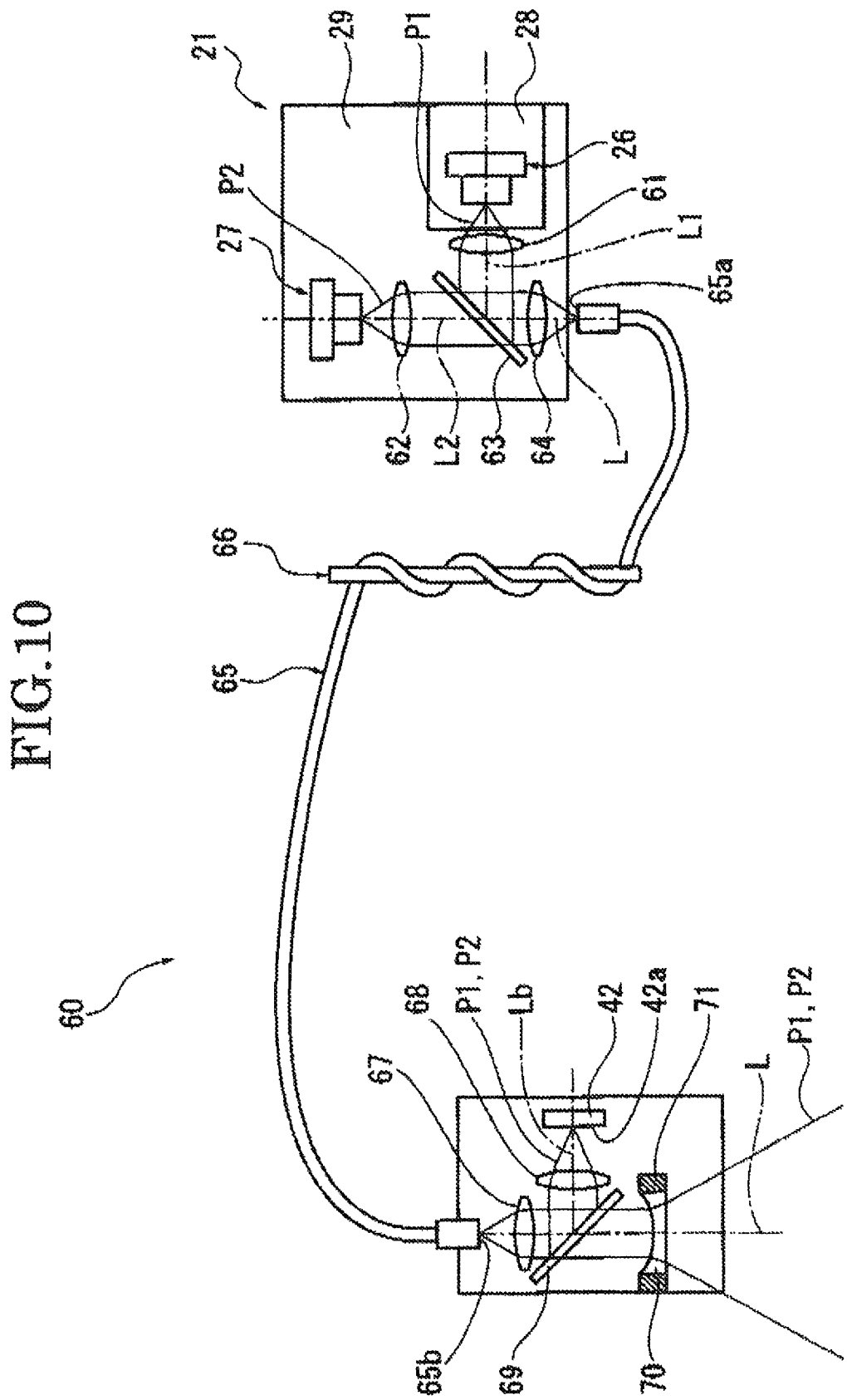
FIG. 10 is a schematic diagram for explaining a structure of an irradiation optical system.

Next, specific features of the plant sensor 10 according to the present invention are described with reference to FIGS. 10 to 12B. The plant sensor 10 includes an irradiation optical system 60 to form a predetermined irradiation area IA (see FIGS. 11A, 11B, 12A and 12B) by using each of the first light emitter 26 and the second light emitter 27. FIG. 10 provides a schematic explanatory diagram for explaining a structure of the irradiation optical system 60. Here, a semi-transparent mirror 69 is omitted in FIG. 11 to facilitate understanding.

In addition to the first light emitter 26 and the second light emitter 27 of the light emission unit 21, the irradiation optical system 60 further includes a first lens 61, a second lens 62, a dichroic mirror 63, a third lens 64, an optical fiber 65, a winding member 66, a fourth lens 67, a fifth lens 68, the semi-transparent mirror 69, a cylindrical lens 70, and the monitoring light receiver 42.

The first lens 61 is provided for the first light emitter 26, and collimates light emitted by the first light emitter 26, that is, the first measuring light P1 into a light flux parallel to a first outgoing optical axis L1. The second lens 62 is provided for the second light emitter 27, and collimates light emitted by the second light emitter 27, that is, the second measuring light P2 into a light flux parallel to a second outgoing optical axis L2. The second outgoing optical axis L2 and the first outgoing optical axis L1 are set to be orthogonal to each other. The dichroic mirror 63 is provided at a position where the second outgoing optical axis L2 and the first outgoing optical axis L1 cross each other.

The dichroic mirror 63 allows the second measuring light P2 from the second light emitter 27 to pass therethrough and to travel toward the third lens 64 on an outgoing optical axis L that is on the same line as the second outgoing optical axis L2, and reflects the first measuring light P1 from the first light emitter 26 toward the third lens 64 on the outgoing optical axis L. In reality, however, the second outgoing optical axis L2 and the outgoing optical axis L are displaced from each other (are not on the same line) due to optical characteristics of the dichroic mirror 63. For this reason, the position of the second light emitter 27 relative to the dichroic mirror 63 and the first light emitter 26 is set such that the second measuring light P2 after passing through the dichroic mirror 63 can travel on the outgoing optical axis L (the second outgoing optical axis L2 can be located on the outgoing optical axis L).

In this embodiment, the dichroic mirror 63 at least reflects light in a wavelength band of around 735 nm (red wavelength band (first wavelength)), and at least allows transmission of light in a wavelength band of around 808 nm (infrared wavelength band (second wavelength)). Thus, the dichroic mirror 63 functions as a light path merging unit to merge an outgoing light path of the first measuring light P1 from the first light emitter 26 and an outgoing light path of the second measuring light P2 from the second light emitter 27, and thereby to cause the first measuring light P1 and the second measuring light P2 to travel to the third lens 64 on the same outgoing optical axis L (a common outgoing light path to be described later). The third lens 64 converges each of the first measuring light P1 reflected by the dichroic mirror 63 and the second measuring light P2 transmitted through the dichroic mirror 63 on a light incident end 65a provided at one end of the optical fiber 65. Here, the set positions of the first light emitter 26 and the second light emitter 27 may be inverted from each other. In the structure with inversion, the first temperature adjustment element 28 has to be arranged at the set position of the first light emitter 26. In addition, as the dichroic mirror 63, a mirror may be used which allows the first measuring light P1 from the first light emitter 26 to pass therethrough and travel to the third lens 64 on the outgoing optical axis L, and which has such a reflection effect on a desired wavelength band that the second measuring light P2 from the second light emitter 27 can be reflected to the third lens 64 on the outgoing optical axis L.

The optical fiber 65 outputs each of the first measuring light P1 and the second measuring light P2, which is inputted through the light incident end 65a, from a light exit end 65b provided at the other end of the optical fiber 65. The optical fiber 65 has a function to transmit each of the first measuring light P1 and the second measuring light P2 thereinside while performing mixing of the measuring light. In this embodiment, a mode scrambler work is applied to the optical fiber 65 in order to promote the mixing effect. The mode scrambler work is made to induce light power transfer among modes inside a light guide of the optical fiber 66. In this embodiment, the optical fiber 65 is wound around a winding member 66 in the mode scrambler work. The winding member 66 applies the mode scrambler work to the optical fiber 65 by making the optical fiber 65 helical within a range of allowable bending radius. As a result, the first measuring light P1 and the second measuring light P2 outputted from the optical fiber 65 (the light exit end 65b) are made uniform in intensity when viewed in a plane orthogonal to the light traveling direction, and thus are made unpolarized light (randomly-polarized light). Here, the first measuring light P1 and the second measuring light P2 emitted from the first light emitter 26 and the second light emitter 27 each have an oval shape when viewed in a plane orthogonal to the light traveling direction. However, the first measuring light P1 and the second measuring light P2 outputted from the light exit end 65b are each formed to have a circular shape corresponding to the light exit end 65b due to the mixing effect. The optical fiber 66 outputs each of the first measuring light P1 and the second measuring light P2, inputted from the light incident end 65a, from the light exit end 66b to the fourth lens 67 on the outgoing optical axis L.

The fourth lens 67 collimates each of the first measuring light P1 and the second measuring light P2 outputted from the light exit end 65b into a light flux parallel to an outgoing optical axis L. The semitransparent mirror 69 is provided on this outgoing optical axis L. The semi-transparent mirror 69 transmits a part of the inputted collimated light flux (each of the first measuring light P1 and the second measuring light P2) and reflects the remaining part thereof onto a branched outgoing optical axis Lb on which the fifth lens 68 is disposed. The fifth lens 68 converges the collimated light flux (each of the first measuring light P1 and the second measuring light P2), which is reflected by the semi-transparent mirror 69, at the branched outgoing optical axis Lb on a light incident surface 42a of the monitoring light receiver 42. The monitoring light receiver 42 constitutes the APC unit 24 (see FIG. 3 and others) as described above. Thus, the semi-transparent mirror 69 functions as a light flux splitter to cause a part of each of the inputted first measuring light P1 and the second measuring light P to branch to the monitoring light receiver 42 that constitutes the measuring light output controller. With this structure, the APC unit is capable of adjusting the output powers of the first light emitter 26 and the second light emitter 27 by using the first measuring light P1 and the second measuring light P2 that are unpolarized light having a uniform intensity distribution after passing through the optical fiber 65 (the common outgoing light path).

The cylindrical lens 70 is also provided on the outgoing optical axis L behind the semi-transparent mirror 69 in the light travel direction. As illustrated in FIGS. 10 to 11B, the cylindrical lens 70 is an optical member having a refractive power only in one direction when viewed in a plane orthogonal to the outgoing optical axis L, and magnifies each of the first measuring light P1 and the second measuring light P2 after passing through the semi-transparent mirror 69, only in the one direction when viewed in a plane orthogonal to the outgoing optical axis L. Here, when outputted from the light exit end 65b of the optical fiber 65, the first measuring light P1 and the second measuring light P2 have a circular cross sectional shape when viewed in a plane orthogonal to the outgoing optical axis L as described above. For this reason, the first measuring light P1 and the second measuring light P2 having the circular cross sectional shape after passing through the semi-transparent mirror 69 are each magnified to a predetermined size only in the one direction by the cylindrical lens 70 thereby to have an oval cross sectional shape (see FIGS. 11A to 12B, and others).

In addition, the cylindrical lens 70 is held to be rotatable about the outgoing optical axis L (rotatable on its own axis) (see FIGS. 11A and 11B) by a rotation driver 71 (see FIG. 10). The rotation driver 71 is fixedly provided to a casing, which is not illustrated, where the irradiation optical system 60 is housed in the plant sensor 10. In the irradiation optical system 60, the cylindrical lens 70 forms a light exit surface from which the first measuring light P1 and the second measuring light P2 is to be emitted. By rotating the cylindrical lens 70 about the outgoing optical axis L (on its own axis), the irradiation optical system 60 is capable of changing the direction of magnifying each of the first measuring light P1 and the second measuring light P2 when viewed in a plane orthogonal to the outgoing optical axis L (the direction is the aforementioned one direction). Thus, the irradiation area IA formed by each of the first measuring light P1 and the second measuring light P2 can be rotated about the outgoing optical axis L (rotated on its own axis).

In the irradiation optical system 60, the first light emitter 26 emits the first measuring light P1 and the second light emitter 27 emits the second measuring light P2 in response to the light-on control by the pulse generator 46 of the computing processing unit 25 as described above. The first measuring light P1 emitted from the first light emitter 26 passes through the first lens 61, is reflected by the dichroic mirror 63, and then travels on the outgoing optical axis L to the third lens 64. The second measuring light P2 emitted from the second light emitter 27 passes through the second lens 62 and the dichroic mirror 63, and travels on the outgoing optical axis L to the third lens 64. In this way, in the irradiation optical system 60, the outgoing light path of the first measuring light P1 and the outgoing light path of the second measuring light P2 are merged by the dichroic mirror 63, and then extend on the outgoing optical axis L to the third lens 64. The light flux (each of the first measuring light P1 and the second measuring light P2) after passing through the third lens 64 is inputted to the optical fiber 65 from the light incident end 65*a*, is outputted from the light exit end 65*b* through the light guide in the optical fiber 65, and travels to the fourth lens 67. A part of the light flux (each of the first measuring light P1 and the second measuring light P2) after passing through the fourth lens 67 on the outgoing optical axis L is reflected by the semi-transparent mirror 69 and is inputted to the monitoring light receiver 42 after passing through the fifth lens 68 on the branched outgoing optical axis Lb. The remaining part of the light flux is formed into an oval shape magnified in one direction by the cylindrical lens 70 and then is outputted from the cylindrical lens 70. In this way, the light path extending to the cylindrical lens 70 through the third lens 64, the optical fiber 65, the fourth lens 67, and the semi-transparent mirror 69 functions as a common outgoing light path connecting the dichroic mirror 63 as the light path merging unit to the cylindrical lens 70 as a light exit portion that defines the light exit surface.

With this structure, the irradiation optical system 60 is capable of emitting the first measuring light P1 and the second measuring light P2 from the same cylindrical lens 70 on the same outgoing optical axis L, and forming the name oval-shaped irradiation areas IA of the first measuring light P1 and the second measuring light P2. In addition, the irradiation optical system 60 is capable of rotating the irradiation areas IA of the first measuring light P1 and the second measuring light P2 about the outgoing optical axis L (on their own axes) by rotating the cylindrical lens 70 with the rotation driver 71 (see FIG. 10) according to needs as illustrated in FIGS. 11A and 11B.

In the plant sensor 10 according to the present invention, the irradiation optical system 60 includes the light path merging unit (the dichroic mirror 63 in this embodiment) to merge the outgoing light path of the first measuring light P1 from the first light emitter 26 and the outgoing light path of the second measuring light P2 from the second light emitter 27, and also includes the common outgoing light path (the third lens 64, the optical fiber 65, the fourth lens 67 and the semi-transparent mirror 69) extending from the light path merging unit to the light exit portion (the cylindrical lens 70 in this embodiment). Thus, the plant sensor 10 is capable of emitting the first measuring light P1 and the second measuring light P2 on the same outgoing optical axis L from the single light exit portion (the cylindrical lens 70), and thereby is capable of locating the irradiation area (irradiation area IA) of the first measuring light P1 and the irradiation area (irradiation area IA) of the second measuring light P2 at exactly the same place. As a result, the plant sensor 10 is able to irradiate the growing condition measurement target (crop Cr) with the first measuring light P1 and the second measuring light P2 under the same conditions, and thereby to appropriately acquire the reflection rates of the first measuring light P1 and the second measuring light P2 by the growing condition measurement target (crop Cr).

Moreover, the plant sensor 10 emits the first measuring light P1 and the second measuring light P2 on the same outgoing optical axis L from the single light exit surface (the cylindrical lens 70) after the light path merging unit merges the two outgoing light paths into the common outgoing light path. Thus, the irradiation area (irradiation area IA) of the first measuring light P1 and the irradiation area (irradiation area IA) of the second measuring light P can be located at exactly the same place regardless of the distance from the light exit surface (the cylindrical lens 70).

Additionally, in the plant sensor 10, since a portion of the common outgoing light path is formed of the optical fiber 65, mixing can be applied to each of the first measuring light P1 and the second measuring light P2. Thus, the first measuring light P1 and the second measuring light P2 can be formed into light fluxes of unpolarized light (randomly-polarized light) having a uniform intensity distribution. With this structure, the plant sensor 10 is capable of more properly acquiring the reflected light of the first measuring light P1 and the second measuring light P2 from the growing condition measurement target (crop Cr), and therefore acquiring the reflection rates of the first measuring light P1 and the second measuring light P2 by the growing condition measurement target (crop Cr) appropriately.

In the plant sensor 10, the light exit surface (the light exit portion) is formed by the cylindrical lens 70, which makes it easy to set the shapes of the irradiation areas IA of the first measuring light P1 and the second measuring light P2.

Figure 12A:
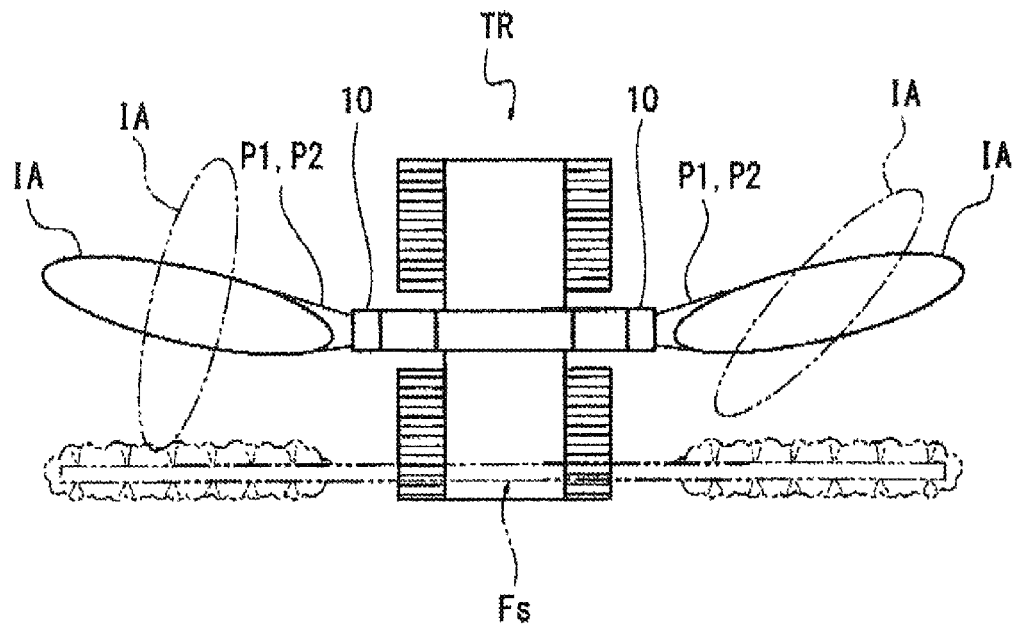
FIG. 12A and FIG. 12B are explanatory diagrams schematically illustrating a state where irradiation areas formed by two plant sensors installed on a tractor are rotated about an outgoing optical axis L (rotated on its own axis)
Figure 12B:
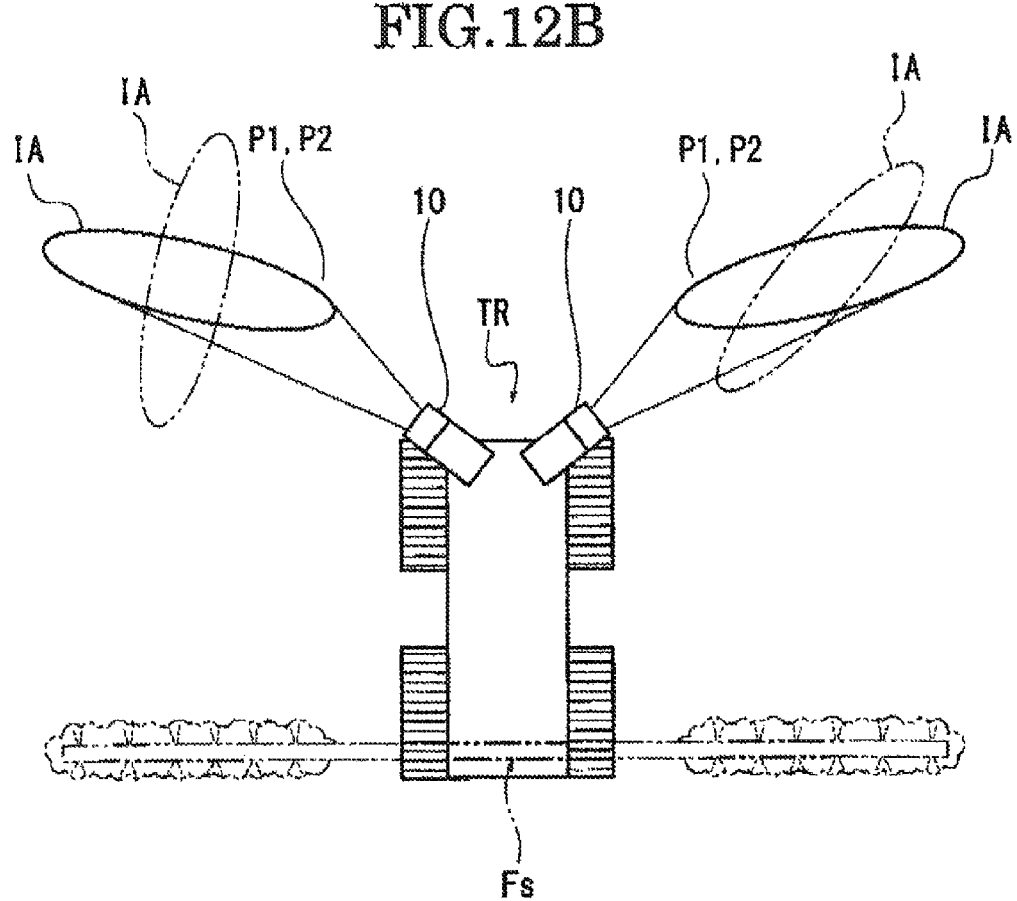

In the plant sensor 10, the cylindrical lens 70 forming the light exit surface (the light exit portion) is made freely rotatable about the outgoing optical axis L (rotatable on its own axis). Only by appropriately adjusting the rotational position of the cylindrical lens 70 in the rotation about the outgoing optical axis L, the rotational positions of the irradiation areas IA of the first measuring light P1 and the second measuring light P2 can be changed in the rotation about the outgoing optical axis L. Thus, regardless of the installation states of the plant sensors 10 on the tractor TR, the formation positions of the irradiation areas IA around the tractor TR can be adjusted as needed, as illustrated in FIGS. 12A and 12B (the irradiation areas IA indicated by solid lines and two-dot chain lines). This increases the degree of freedom for installing the plant sensors 10 on the tractor TR. Here, FIGS. 12A and 12B illustrate examples in which plant sensors 10 are installed on a tractor TR equipped with a fertilizer spreader Fs. FIG. 12A provides a view in which two plant sensors 10 are installed on both lateral sides of the tractor TR, and FIG. 12B provides a view in which two plant sensor 10 are installed on the right and left front sides of the tractor TR. As illustrated in FIGS. 12A and 12B, even though the installation states of the two plant sensors 10 on the tractor TR are changed, appropriate adjustment of the formation positions of the irradiation areas IA around the tractor TR (appropriate adjustment of the rotational positions of the cylindrical lenses 70 in the rotation about the outgoing optical axis L) locates the irradiation areas IA at places suitable for areas onto which the fertilizer spreader Fs should spread the fertilizer.

In the plant sensor 10, the cylindrical lens 70 forming the light exit surface (the light exit portion) is made freely rotatable about the outgoing optical axis L (rotatable on its own axis) by the rotation driver 71. With this structure, even after the plant sensors 10 are installed on the tractor TR, the formation positions of the irradiation areas IA around the tractor TR can be appropriately adjusted (the irradiation areas IA indicated by the solid lines and the two-dot chain lines as illustrated in FIGS. 12A and 12B), for example. Thus, the plant sensors 10 is capable of irradiating any desired positions (the irradiation areas IA) with the first measuring light P1 and the second measuring light P2 according to intended usage, and thereby acquiring information on the growing condition of the growing condition measurement target (crop Cr) by using the first measuring light P1 and the second measuring light P2.

In the plant sensor 10, the optical fiber 65 forming the portion of the common outgoing light path is processed by the mode scrambler work by being wound around the winding member 66. Thus, the plant sensor 10 is capable of performing more efficient mixing of the first measuring light P1 and the second measuring light P2, and thereby forming the first measuring light P1 and the second measuring light P2 into light fluxes of unpolarized light (randomly-polarized light) having a uniform intensity distribution more reliably. Here, we actually manufactured a plant sensor with the foregoing structure. In the plant sensor thus manufactured, the polarization ratio of the first measuring light P1 emitted from the first light emitter 26 is 20:1, and the polarization ratio of the first measuring light P1 outputted from the light exit end 65b is improved to be 1.1:1.

In the plant sensor 10, the mode scrambler work applied to the optical fiber 65 is made by winding the optical fiber 65 around the winding member 66. Thus, the structure can be made simple and small.

The plant sensor 10 is configured to make the monitoring light receiver 42 in the APC unit 24 receive a part of the first measuring light P1 and a part of the second measuring light P2 after mixing by the optical fiber 65. Thus the plant sensor 10 is able to more properly acquire the first measuring light P1 and the second measuring light P2 emitted from the first light emitter 26 and the second light emitter 27, and more appropriately adjust the output powers of the first light emitter 26 and the second light emitter 27. As a result, the plant sensor 10 is capable of irradiating the growing condition measurement target (crop Cr) with the more stable first measuring light P1 and second measuring light P2, and thereby acquire the reflection rates of the first measuring light P1 and the second measuring light P2 by the growing condition measurement target (crop Cr) more appropriately.

The plant sensor 10 is configured to form the first measuring light P1 and the second measuring light P2 into the light fluxes of unpolarized light having a circular cross-sectional shape with a uniform intensity distribution through mixing by the optical fiber 65, and then to set the shapes of the irradiation areas IA of the first measuring light P1 and the second measuring light P2 by using the cylindrical lens 70. Thus, the plant sensor 10 is able to form the irradiation areas IA having a stable shape, size, and intensity distribution, and thereby obtain the reflection rates of the first measuring light P1 and the second measuring light P2 by the growing condition measurement target (crop Cr) more properly.

The plant sensor 10 is configured to form the first measuring light P1 and the second measuring light P2 into the light fluxes of unpolarized light having a circular cross-sectional shape with a uniform intensity distribution through mixing by the optical fiber 65, and then to set the shapes of the irradiation areas IA of the first measuring light P1 and the second measuring light P2 by using the cylindrical lens 70. In this structure, the shapes and sizes of the irradiation areas IA can be set as needed by making appropriate settings of the diameter size of the optical fiber 65 (the light exit end 65b), optical characteristics of the fourth lens 67, and optical characteristics of the cylindrical lens 70.

The plant sensor 10 is capable of obtaining the normalized difference vegetation index of the growing condition measurement target (crop Cr) irradiated with the first measuring light P1 and the second measuring light P2, on the basis of the appropriately-obtained reflection rates of the first measuring light P1 and the second measuring light P2, and thereby is capable of obtaining the information on the growing condition of the growing condition measurement target (crop Cr) more accurately.

The plant sensor 10 is capable of acquiring the reflected light Pr from the growing condition measurement target (crop Cr) irradiated with the more stable first measuring light P1 and second measuring light P2, and then calculating the reflection rates of the first measuring light P1 and the second measuring light P2 by using the reflected light Pr in which the influence of the light component due to the ambient light is reduced to an extremely low level. Thus, the plant sensor 10 is capable of obtaining the normalized difference vegetation index of the growing condition measurement target (crop Cr) extremely accurately, and thereby obtaining the information on the growing condition thereof extremely accurately.

The plant sensor 10 is configured to cause the first measuring light P1 and the second measuring light P2 emitted from the first light emitter 26 and the second light emitter 27 to pass through the optical fiber 65, and then to output the first measuring light P1 and the second measuring light P2 from the light exit end 65b of the optical fiber 65. This structure enables massive expansion of the practical area of a light source, and thereby allows the plant sensor 10 to easily meet the laser safety standards (regulation). This is because the area of the light exit end 65b of the optical fiber 65 is much larger than the light source area (the area of the light emission portion) of each of the first light emitter 26 and the second light emitter 27 including a pulsed laser diode (PLD).

The plant sensor 10 is capable of emitting the first measuring light P1 and the second measuring light P2 more stably because the temperature adjustment of the first light emitter 26 and the second light emitter 27 is made by the first temperature detection element 30, the first temperature adjustment element 28, and the second temperature detection element 31. Thus, the plant sensor 10 is capable of obtaining the reflection rates of the first measuring light P1 and the second measuring light P2 by the growing condition measurement target (crop Cr) more properly.

In addition to the aforementioned structure, the light exit portion includes an optical member having a refractive power only in one direction when viewed in a plane orthogonal to the outgoing optical axis and the optical member is held to be rotatable about the outgoing optical axis. This structure enables easy settings of the shapes of the irradiation areas formed by the first measuring light and the second measuring light.

Moreover, the optical member forming the light exit portion and having a refractive power only in the one direction is made freely rotatable about the outgoing optical axis (rotatable on its own axis). Thus, the rotational positions of the irradiation areas of the first measuring light and the second measuring light in the rotation about the outgoing optical axis can be changed only by appropriate adjustment of the rotational position of the optical member in the rotation about the outgoing optical axis.

Further, the foregoing structure forms the first measuring light and the second measuring light into light fluxes of unpolarized light having a circular cross sectional shape with a uniform intensity distribution by mixing the first and second measuring light by use of the optical fiber, and then sets the shapes of the irradiation areas of the first measuring light and the second measuring light by using the optical member having the refractive power only in the one direction. This structure enables the formation of irradiation areas stable in shape, size and intensity distribution. Thus, the reflection rates of the first measuring light and the second measuring light by the growing condition measurement target can be obtained more properly.

In addition to the aforementioned structure, the common outgoing light path includes a light flux splitter provided between the optical fiber and the light exit portion, and configured to branch a part of each of the first measuring light and the second measuring light to the measuring light output controller. In this structure, the measuring light output controller is able to acquire the part of each of the first measuring light and the second measuring light after mixing by the optical fiber. Thus, the measuring light output controller is able to more properly obtain the first measuring light and the second measuring light on the basis of the acquired information, and thereby adjust the output powers of the first light emitter and the second light emitter more appropriately. Consequently, more stable first measuring light and second measuring light can be emitted to the growing condition measurement target, and thereby the reflection rates of the first measuring light and the second measuring light by the growing condition measurement target can be obtained more properly.

In this way, the plant sensor 10 according to the present invention is able to more properly acquire the reflected light fluxes of two measuring light fluxes having different wavelengths.

In the foregoing embodiment, the plant sensor 10 has been described as an exemplary plant sensor according to the present invention. However, the present invention is not limited to the above embodiment. Any plant sensor may be employed to implement the present invention, the plant sensor including: a first light emitter configured to emit first measuring light with a first wavelength to irradiate a growing condition measurement target therewith; a second light emitter configured to emit second measuring light with a second wavelength to irradiate the growing condition measurement target therewith; a light receiver configured to receive reflected light of each of the first and second measuring light from the growing condition measurement target; a controller configured to control light emission such that the first light emitter and the second light emitter emit light at timings different from each other; a light path merging unit configured to merge a first outgoing light path of the first measuring light from the first light emitter and a second outgoing light path of the second measuring light from the second light emitter; and a common outgoing light path connecting the light path merging unit to a light exit portion from which each of the first measuring light and the second measuring light is to be emitted to the growing condition measurement target.

Additionally, in the foregoing embodiment, the light (light flux) having a peak value with a wavelength of 735 nm is used as the first measuring light P1 (the first light emitter 26). However, the first measuring light P1 may be any light (light flux) in a red wavelength band (first wavelength), and is not limited to the one in the above embodiment.

Moreover, in the foregoing embodiment, the light (light flux) having a peak value with a wavelength of 808 nm is used as the second measuring light P2 (the second light emitter 27). However, the second measuring light P2 may be any light (light flux) in an infrared wavelength band (second wavelength), and is not limited to the one in the above embodiment.

In the aforementioned embodiment, the crop Cr as the agricultural product is cited as an example of the growing condition measurement target. However, the growing condition measurement target may be any cultured or voluntarily growing plants, as long as the growing condition of the plants can be determined by using the reflection rates at which the plants reflects two measuring light fluxes with different wavelengths, respectively, and thereby is not limited to the one in the above embodiment.

In the aforementioned embodiment, the reflection rate of the first measuring light P1 is calculated by using the total light emission volume of the first light emitter 26. Instead, the calculation of the reflection rate of the first measuring light P1 may be based on the received light signal from the monitoring light receiver 42 and the first received light signal ISa, and thus is not limited to the one in the above embodiment.

In the aforementioned embodiment, the reflection rate of the second measuring light P2 is calculated by using the total light emission volume of the second light emitter 27. Instead, the calculation of the reflection rate of the second measuring light P2 may be based on the received light signal from the monitoring light receiver 42 and the second received light signal ISb, and thus is not limited to the one in the above embodiment.

Although the preferred embodiment of the plant sensor of the present invention has been described hereinabove, it should be noted that the present invention is not limited to the above embodiment, and that the embodiment can be given various modifications, additions or the like without departing from the gist of the present invention.

What is claimed is:

1. A plant sensor comprising:
   a first light emitter configured to emit first measuring light with a first wavelength to irradiate a growing condition measurement target with the first measuring light;
   a second light emitter configured to emit second measuring light with a second wavelength to irradiate the growing condition measurement target with the second measuring light;
   a light receiver configured to receive reflected light of each of the first and second measuring light from the growing condition measurement target and output a received light signal;

a controller configured to control light emission such that the first light emitter emits the first measuring light and the second light emitter emits the second measuring light at timings different from each other;

a light path merging unit configured to merge a first outgoing light path of the first measuring light from the first light emitter and a second outgoing light path of the second measuring light from the second light emitter; and a common outgoing light path connecting the light path merging unit to a light exit portion from which each of the first measuring light and the second measuring light is to be emitted to the growing condition measurement target.

2. The plant sensor according to claim 1, wherein at least a portion of the common outgoing light path is formed of an optical fiber.

3. The plant sensor according to claim 2, wherein a mode scrambler work is applied to the optical fiber.

4. The plant sensor according to claim 1, wherein the light exit portion includes an optical member having a refractive power only in one direction when viewed in a plane orthogonal to an outgoing optical axis, and the optical member is held to be rotatable about the outgoing optical axis.

5. The plant sensor according to claim 2, wherein the common outgoing light path includes a light flux splitter provided between the optical fiber and the light exit portion, and configured to branch a part of each of the first measuring light and the second measuring light to a measuring light output controller.

6. The plant sensor according to claim 3, wherein the common outgoing light path includes a light flux splitter provided between the optical fiber and the light exit portion, and configured to branch a part of each of the first measuring light and the second measuring light to a measuring light output controller.

7. The plant sensor according to claim 4, wherein the common outgoing light path includes a light flux splitter provided between the optical fiber and the light exit portion, and configured to branch a part of each of the first measuring light and the second measuring light to a measuring light output controller.

8. The plant sensor according to claim 2, wherein the light exit portion includes an optical member having a refractive power only in one direction when viewed in a plane orthogonal to an outgoing optical axis, and the optical member is held to be rotatable about the outgoing optical axis.

9. The plant sensor according to claim 3, wherein the light exit portion includes an optical member having a refractive power only in one direction when viewed in a plane orthogonal to an outgoing optical axis, and the optical member is held to be rotatable about the outgoing optical axis.

\* \* \* \* \*